No. 618,853. Patented Feb. 7, 1899.
G. S. DUNN.
BRUSH HOLDER FOR DYNAMO ELECTRIC MACHINES.
(Application filed Apr. 30, 1898.)
(No Model.)

Witnesses:
Samuel W. Balch
H. H. Whitman

Inventor,
Gano S. Dunn,
by Thomas Ewing, Jr.,
Attorney.

UNITED STATES PATENT OFFICE.

GANO S. DUNN, OF EAST ORANGE, NEW JERSEY, ASSIGNOR TO THE CROCKER-WHEELER ELECTRIC COMPANY, OF NEW JERSEY.

BRUSH-HOLDER FOR DYNAMO-ELECTRIC MACHINES.

SPECIFICATION forming part of Letters Patent No. 618,853, dated February 7, 1899.

Application filed April 30, 1898. Serial No. 679,298. (No model.)

*To all whom it may concern:*

Be it known that I, GANO S. DUNN, a citizen of the United States of America, and a resident of East Orange, county of Essex, and State of New Jersey, have invented certain new and useful Improvements in Brush-Holders for Dynamo-Electric Machines, of which the following is a specification.

The object of my invention is to mount the brushes so that they may be individually adjusted for the sparkless collection of current. It is especially useful where there are more than two brushes. The proper adjustment of any set of brushes depends on their being so positioned that as each commutator-bar comes directly under it the armature-coil connected to the bar will occupy a position symmetrical with the coils under the other sets of brushes in relation to the magnetic fringe between adjoining poles of the field. Heretofore this has been approximately effected by giving to the brush-holder supports a uniform angular spacing. This would be sufficient if the magnetic fringes between adjoining poles of the field could also be evenly spaced at angular positions corresponding to the spacing of the brush-holder supports; but this is not possible, owing to the varying distance between the poles, because of unequal shrinkage of the castings or imperfect centering of the polar cavity or inaccuracies in the pole-shoe castings. Furthermore, even if the poles are properly spaced there may be perturbations in the magnetic fields from eccentric position of the armature in the polar cavity or inequalities in the strengths of the poles because of slight differences in the field-windings or in the magnetic conductivities of the cores and pole-pieces.

The brush-holder supports are so mounted that they can be separately adjusted toward and from each other around the commutator a sufficient amount to correct for these irregularities, and this adjustment is effected in the form herein shown, which is my preferred form, in the direction of the circumference of the commutator in such a manner that the proper seating of the brushes on the commutator will not be disturbed.

Figure 1:
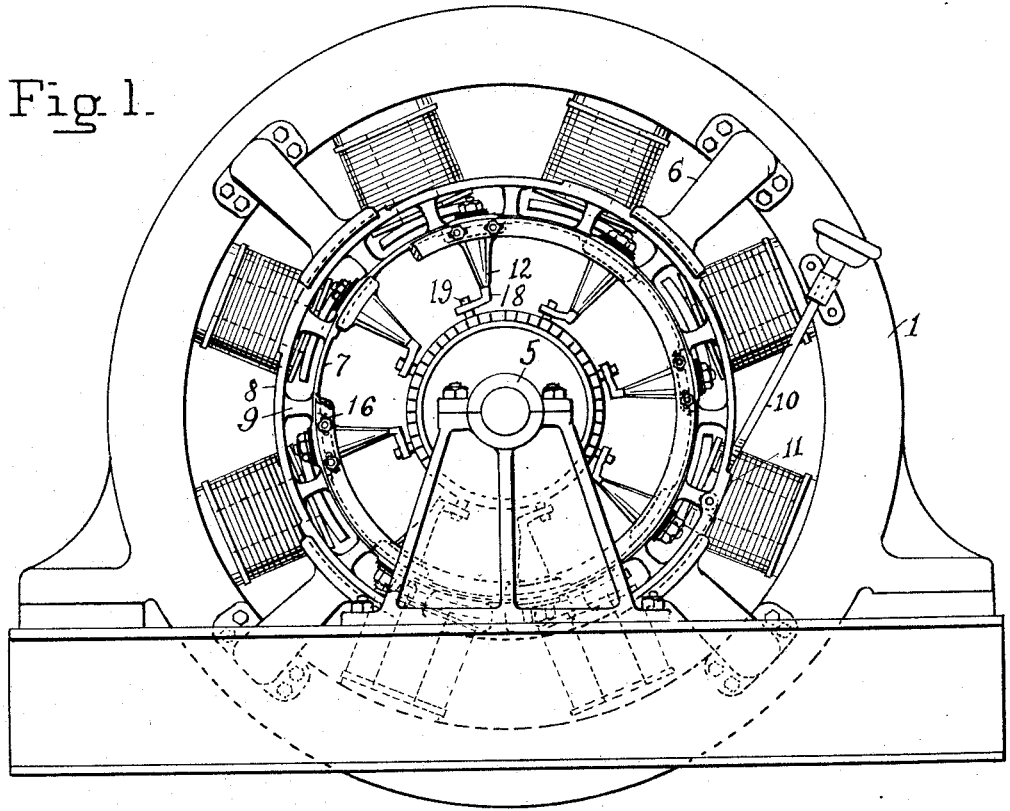
Figure 2:
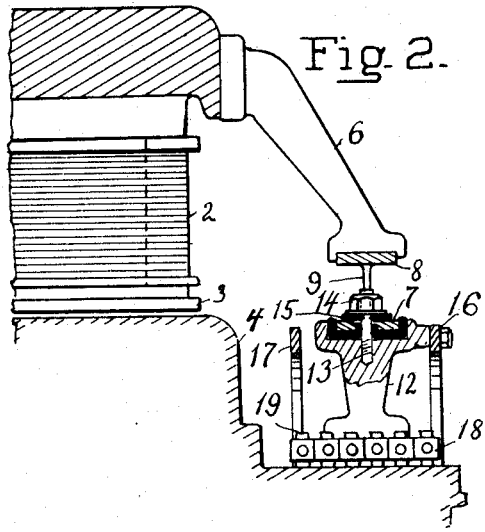
Figure 3:
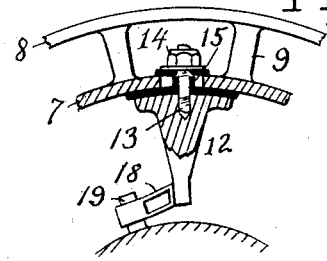

Referring to the accompanying sheet of drawings, which form a part of this specification, Figure 1 is an end elevation of the machine. Fig. 2 is a cross-section on a vertical plane through the upper part of the machine and frame. Fig. 3 shows a portion of the rocker-ring with the inner band in section and an attached brush-holder support partly broken away.

The frame 1 of the machine is provided with inwardly-projecting poles, which pass through the field-coils 2 and terminate in pole-shoes 3. The armature 4 is mounted on bearings 5, so that it will revolve in the polar cavity. To the frame of the machine are attached brackets 6, which are grooved at their ends to engage and hold a rocker-ring made up of two bands 7 and 8, united by cross-pieces 9. This ring is adjustable around its center by means of a screw 10, which is mounted on the frame and engages with a nut 11, pivoted to the ring. These parts attached to the frame of the machine constitute a brush-holder rigging.

Brush-holder supports (shown as brackets 12) are attached to the band 7 of the rocker-ring by studs 13, on the ends of which are nuts 14. The studs pass through slots in the band. Insulating material 15 surrounds the studs where they pass through the band, and insulating material lies under the washers of the nuts and between the brush-holder brackets and band and is used to insulate the brackets from the rocker-ring. These brush-holder brackets project inwardly, and on slackening the nuts they can be adjusted circumferentially with respect to the rocker-ring and independently of each other by reason of the fact that the holes in the band 7 through which the studs pass are elongated. There is a set of brushes for each pole. Two current-collecting conductors 16 17 in the form of flat rings are attached one to the positive brackets and one to the negative brackets. The holes in these conductors through which the attaching-bolts pass are also elongated to permit of the independent circumferential adjustment of the brackets.

Suitable fixtures 18 are attached to the brush-holder brackets to carry the brushes 19.

In the form of brush-rigging shown the point of support of the brush-holder brackets is in a rocker-ring whose center coincides with the axis of the commutator. Therefore the perpendicular seating of the brushes on the commutator is not disturbed by adjustment circumferentially either of the rocker-ring or of any individual set of brushes with respect to the ring, as such adjustments do not disturb the position of the brushes radially to the commutator and preserve their perpendicular seating on the commutator.

What I claim, and desire to secure by Letters Patent of the United States, is—

1. In a dynamo-electric machine, the combination of a commutator, a brush-holder rigging centered upon the axis of the commutator and revoluble in a circle concentric thereto, and brush-holder supports mounted upon the rigging and independently adjustable thereon circumferentially around the commutator, and adjustable together around the commutator by the movement of the rigging, substantially as described.

2. In a dynamo-electric machine, the combination of a commutator, brackets, having grooves therein, a brush-holder rigging consisting of two connected rings, concentric with each other and with the axis of the commutator, one of the rings being contained in the grooves of the brackets, whereby the rigging may be revolved in a circle concentric with the axis of the commutator, and brush-holder supports mounted upon the other ring and movable circumferentially thereon independent of each other, substantially as described.

Signed by me, at New York city, this 28th day of April, 1898.

GANO S. DUNN.

Witnesses:
W. A. O'CONNOR,
B. J. HAMILTON.